(12) United States Patent
Yamaguchi

(10) Patent No.: US 6,435,640 B1
(45) Date of Patent: Aug. 20, 2002

(54) INK-JET PRINTER

(75) Inventor: Hiroshi Yamaguchi, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/435,981

(22) Filed: Nov. 8, 1999

(30) Foreign Application Priority Data

Nov. 11, 1998 (JP) ............................................. 10-320821

(51) Int. Cl.$^7$ ................................................. B41J 2/205
(52) U.S. Cl. ........................................... 347/15; 347/43
(58) Field of Search ............................. 347/15, 41, 43, 347/40; 358/465, 460

(56) References Cited

U.S. PATENT DOCUMENTS

| | | | |
|---|---|---|---|
| 5,384,587 A | * | 1/1995 | Takagi et al. .................. 347/41 |
| 5,710,582 A | * | 1/1998 | Hawkins et al. ............... 347/42 |
| 5,717,448 A | * | 2/1998 | Inada ........................... 347/43 |
| 5,745,131 A | * | 4/1998 | Kneezel et al. ................ 347/43 |

FOREIGN PATENT DOCUMENTS

| | | | |
|---|---|---|---|
| EP | 0023433 | * 4/1981 | .................. 347/42 |
| JP | 7-40548 | 2/1995 | |
| JP | 10-138520 | 5/1998 | |

* cited by examiner

*Primary Examiner*—N. Le
*Assistant Examiner*—Lamson D. Nguyen
(74) *Attorney, Agent, or Firm*—Frishauf, Holtz, Goodman, Langer & Chick, P.C.

(57) ABSTRACT

An ink-jet printer includes a print head for printing a plurality of dots as an image by ejecting ink onto a paper sheet while the paper sheet is moving in a predetermined direction, and a print control section which stores a plurality of dot data assigned to the plurality of dots to designate tones thereof and which drives the print head according to the plurality of dot data. The print control section includes a correction section for correcting a tone of a target dot on the basis of a tone designated by dot data assigned to a dot adjacent to the target dot in the predetermined direction, in a manner so as to compensate for an ink flow due to inertia of semi-dried ink against movement of the paper sheet.

9 Claims, 7 Drawing Sheets

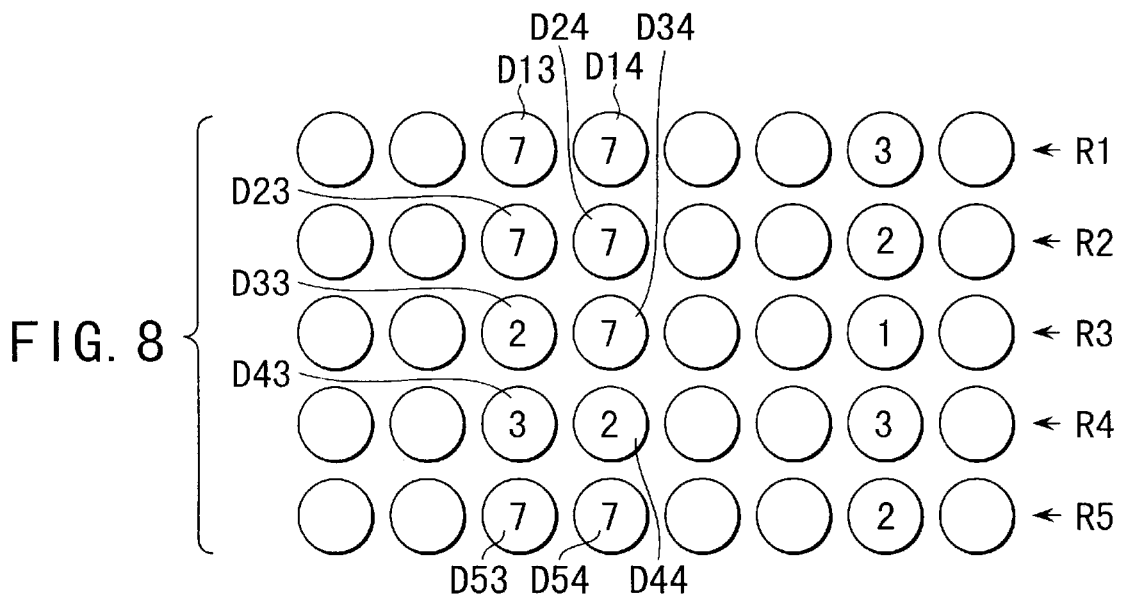
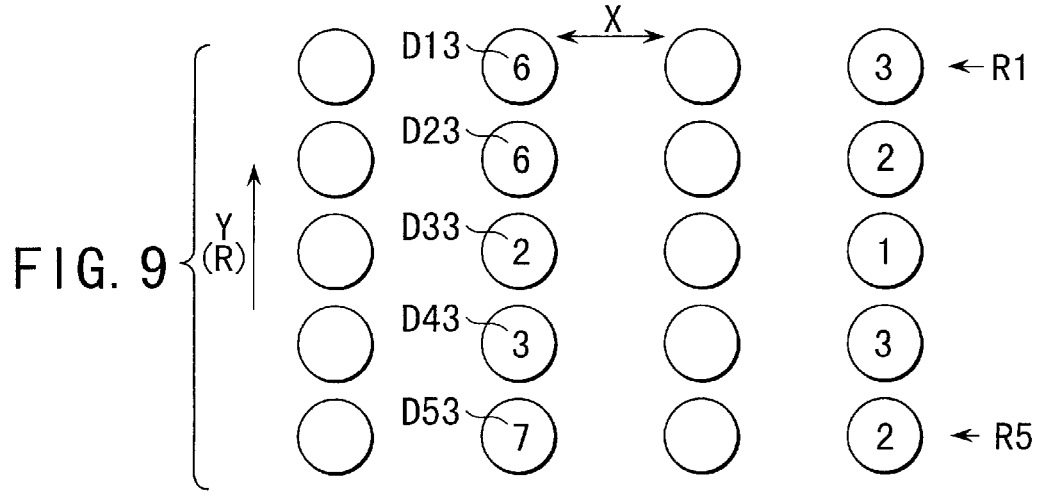
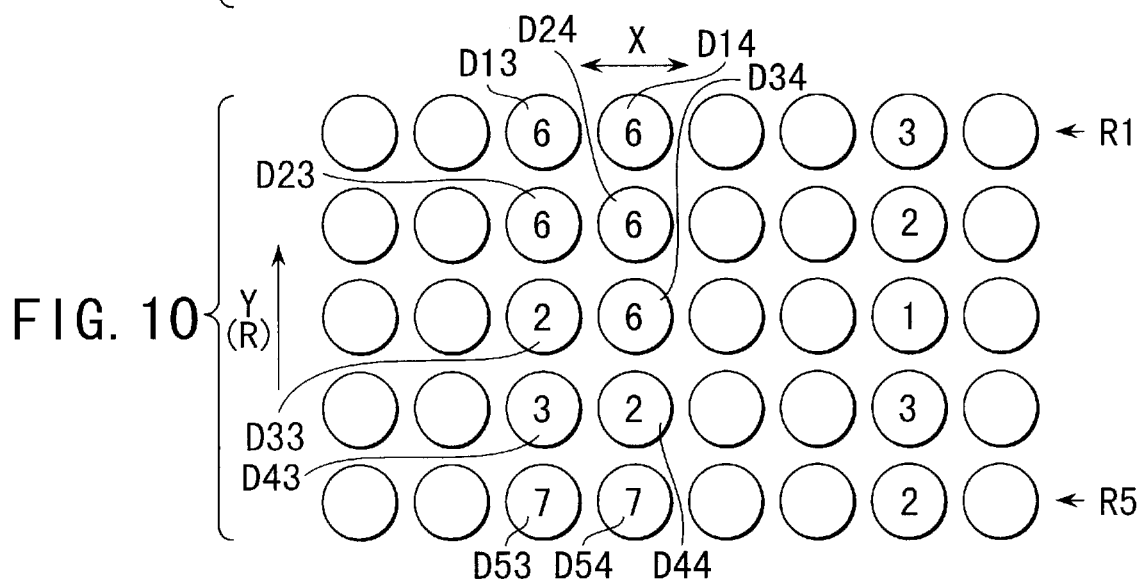

INK-JET PRINTER

BACKGROUND OF THE INVENTION

The present invention relates to an ink-jet printer for jetting or ejecting ink from a print head in order to print dots as an image and, more particularly, to an ink-jet printer in which the tone of each dot is controlled by an amount of ejected ink.

For example, Jpn. Pat. Appln. KOKAI Publication No. 10-138520 discloses a rotary drum ink-jet printer which can print a large number of pages within a short period of time. The rotary drum ink-jet printer has a rotary drum for rotating in one direction, and a print head for printing an image on a paper sheet which is wound around the rotary drum to rotate together with it. The print head has a plurality of ink-jet nozzles arranged across the paper sheet in the axial direction of the rotary drum. These ink-jet nozzles eject ink onto the paper sheet which moves relative to the print head upon rotation of the rotary drum. In this arrangement, unlike in the conventional serial ink-jet printer, the print head need not be moved across the paper sheet, so printing can be performed at a high speed.

Many ink-jet printers employ either the single-drop scheme or the multi-drop scheme. According to the single-drop scheme, each ink-jet nozzle ejects a single ink drop to print a dot. According to the multi-drop scheme, each ink-jet nozzle ejects one or more ink drops to print a dot. The tone of each dot is controlled by the volume of single ink drop in the single-drop scheme, and by the number of ink drops in the multi-drop scheme.

When ink collides against the paper sheet, it forms a dot having a diameter slightly larger than the nozzle diameter, as shown in FIG. 1. In a case where an image is formed of dots aligned at a pitch equal to the nozzle diameter, adjacent dots partially overlap. Generally, if the tones of adjacent dots are similar, they do not greatly degrade the image quality.

The amount of ejected ink increases in proportion to the tone of a dot. Each dot is influenced by the increased amount of ink if the dot is adjacent to a high-tone dot as shown in FIG. 2. More specifically, the ink flows from a certain dot to another adjacent dot depending on the ink characteristics such as viscosity, permeability, and drying speed, and the paper sheet characteristics such as water absorption properties, dryness, and thickness, and the flowed ink is sometimes observed as smear. In particular, if these dots are printed in the same color, the inks thereof have a high affinity that allows the inks to be mixed with each other more easily than with a different-color ink to integrate the dots. In most cases, ink flows from a high-tone dot to a low-tone dot. The image quality is degraded by smear of ink flowing between dots having the same color. When a dot of another color overlaps a dot having ink smear, the image quality is affected by color mixture of these dots as well. Since the ink stays in the liquid state until it is absorbed by the paper sheet rotating together with the rotary drum and dries, it sometimes flows on the paper sheet in a direction opposite to rotation of the drum. When the rotary drum rotates at a high speed, the ink may scatter around from the paper sheet. The image quality may be degraded for these reasons as well.

BRIEF SUMMARY OF THE INVENTION

It is an object of the present invention to provide an ink-jet printer which can prevent degradation in quality of a multi-tone image caused by ink smear.

According to the present invention, there is provided an ink-jet printer comprising a print head for printing a plurality of dots as an image by ejecting ink onto a print medium while the print medium is moving in a predetermined direction, and a print control section which stores a plurality of dot data assigned to the plurality of dots to designate tones thereof and which drives the print head according to the plurality of dot data, wherein the print control section includes a correction section for correcting a tone of a target dot on the basis of a tone designated by dot data assigned to a dot adjacent to the target dot in the predetermined direction, in a manner so as to compensate for an ink flow due to inertia of semi-dried ink against movement of the print medium.

In this ink-jet printer, the tone of each dot is corrected on the basis of the tone designated by the dot data assigned to a dot adjacent to the dot. More specifically, this correction can selectively decrease the tones of adjacent dots which are influenced by semi-dried ink, so that quality degradation of the image due to ink smear can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is a view showing a plurality of dots printed while the rotary drum shown in FIG. 1 rotates twice, and tones designated by dot data items assigned to these dots;

FIG. 9 is a view showing the result of tone correction performed in the subscanning direction for the first group of dots printed according to the tone designation shown in FIG. 8 during the first rotation of the rotary drum;

FIG. 10 is a view showing the result of tone correction performed in the subscanning direction for the second group of dots printed according to the tone designation shown in FIG. 8 during the second rotation of the votary drum;

DETAILED DESCRIPTION OF THE INVENTION

An ink-jet printer according to the first embodiment of the present invention will be described with reference to the accompanying drawings.

Figure 3:
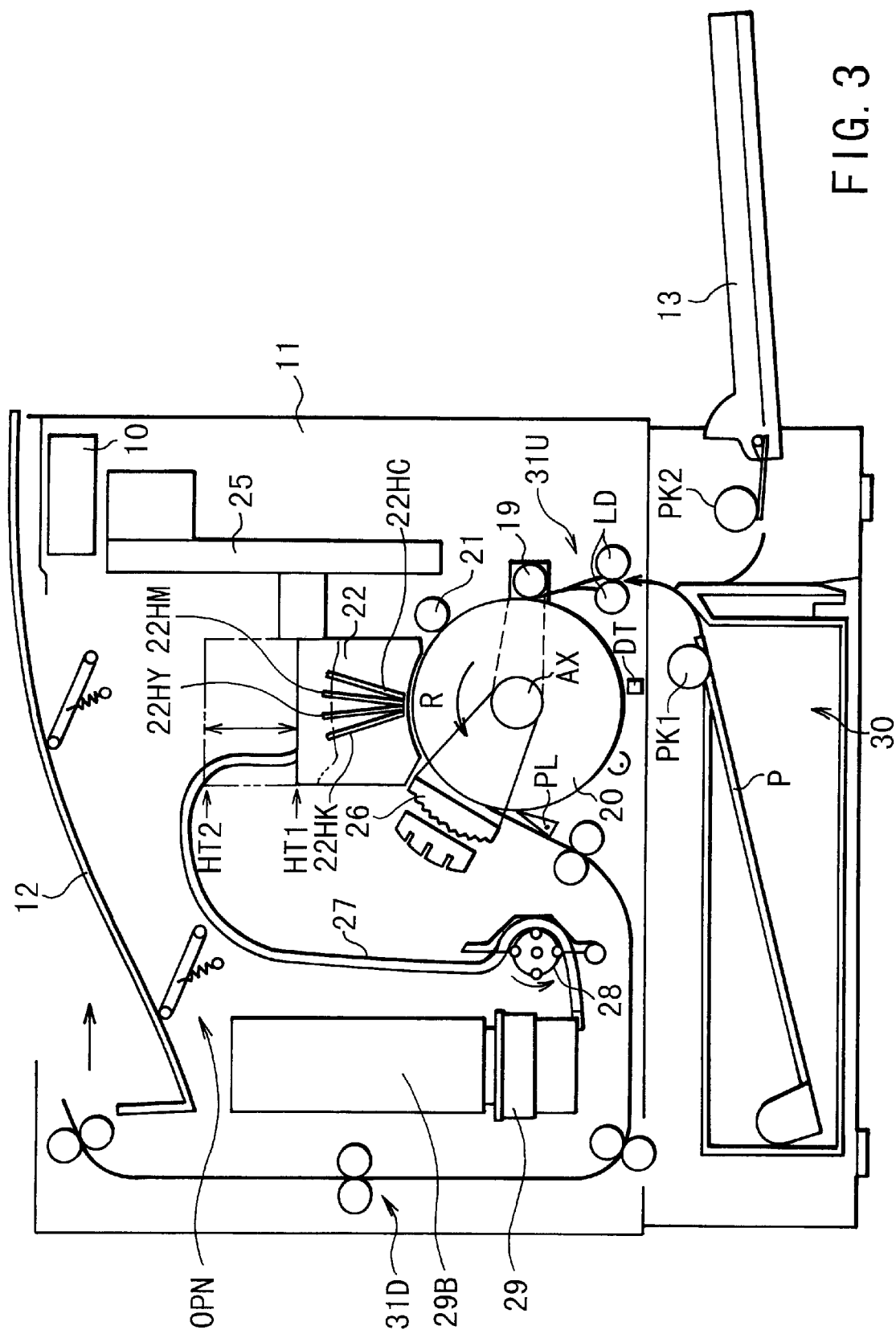
FIG. 3 is a view schematically showing the internal structure of an ink-jet printer according to the first embodiment of the present invention.

FIG. 3 shows the internal structure of this ink-jet printer. This ink-jet printer is used to print a multi-color or monochromatic image on, e.g., an A4 paper sheet P obtained by cutting plain paper into sheets as print media. The ink-jet printer has a rotary drum 20 which rotates in one direction R, a rotational position detector DT for detecting the rotational position of the rotary drum 20, a manual feed tray 13 for receiving a paper sheet manually inserted, a sheet cassette 30 for storing a stack of paper sheets, a sheet feed-in mechanism 31U for feeding the paper sheet from each of the sheet cassette 30 and manual feed tray 13 to the rotary drum 20, a charging roller 21 for applying an electrostatic charge onto the rotary drum 20, a print head 22 for printing a plurality of dots as an image on the paper sheet which is held on the rotary drum 20 by electrostatic attraction and rotates together with the rotary drum 20, a sheet feed-out mechanism 31D for feeding out the paper sheet printed while being held on the rotary drum 20, an ink supply section 29 arranged away from the print head 22 to supply inks of four different colors to the print head 22, a print control section 10 for controlling the overall operation of the ink-jet printer, and a housing 11 for housing the components described above. The manual feed tray 13 is mounted on the housing 11 such that it can be opened and closed, and serves as a cover of the housing 11 when it is closed. The rotary drum 20 is driven by a rotating mechanism 19 to rotate at a constant circumferential speed.

As shown in FIG. 3, the rotary drum 20 is disposed near the central position of the housing 11. The print head 22 is disposed above the rotary drum 20. The sheet cassette 30 is disposed below the rotary drum 20. The rotational position detector DT is disposed at a position close to the peripheral surface of the rotary drum 20. The rotary drum 20 is rotatably supported about an axis AX to hold the paper sheet wound around is peripheral surface upon rotation thereof.

The sheet feed-in mechanism 31U has a pickup roller PK1 for picking up the paper sheet from the sheet cassette 30, a pickup roller PK2 for picking up the paper sheet from the manual feed tray 13, and a sheet loader LD for loading the paper sheet picked up from one of the manual feed tray 13 and sheet cassette 30 onto the rotary drum 20, such that the widthwise direction of the paper sheet coincides with the axial direction of the rotary drum 20. The sheet loader LD has a pair of pinch rollers which rotate while pinching the paper sheet. These pinch rollers are controlled by the print control section 10 such that they start loading the paper sheet when it is detected by the rotational position detector DT that the rotary drum 20 has been rotated to a predetermined position. The paper sheet is printed by the print head 22 while it rotates together with the rotary drum 20. After printing, the paper sheet is separated from the peripheral surface of the rotary drum 20 by a sheet separator PL, and is feed out to a delivery tray 12 by the sheet feed-out mechanism 31D. The sheet separator PL has a separation pawl which is brought into contact with the rotary drum 20 at the time of separating the paper sheet. The delivery tray 12 is opened and closed with respect to the housing 11 by an opening/closing mechanism OPN.

The print head 22 can be vertically moved by an elevator 25. At the time of printing, the print head 22 is set to a print position HT1 close to the rotary drum 20. At the time of maintenance, the print head 22 is set to a maintenance position HT2 which is more distant from the rotary drum 20 than the print position HT1 in the radial direction of the rotary drum 20. A head cleaner 26 is interposed between the print head 22 and rotary drum 20 to clean the distal end face of the print head 22 while the print head 22 is set to the maintenance position HT2. The print head 22 can reciprocate slightly in a main scanning direction X parallel to the axial direction of the rotary drum 20.

Figure 5:
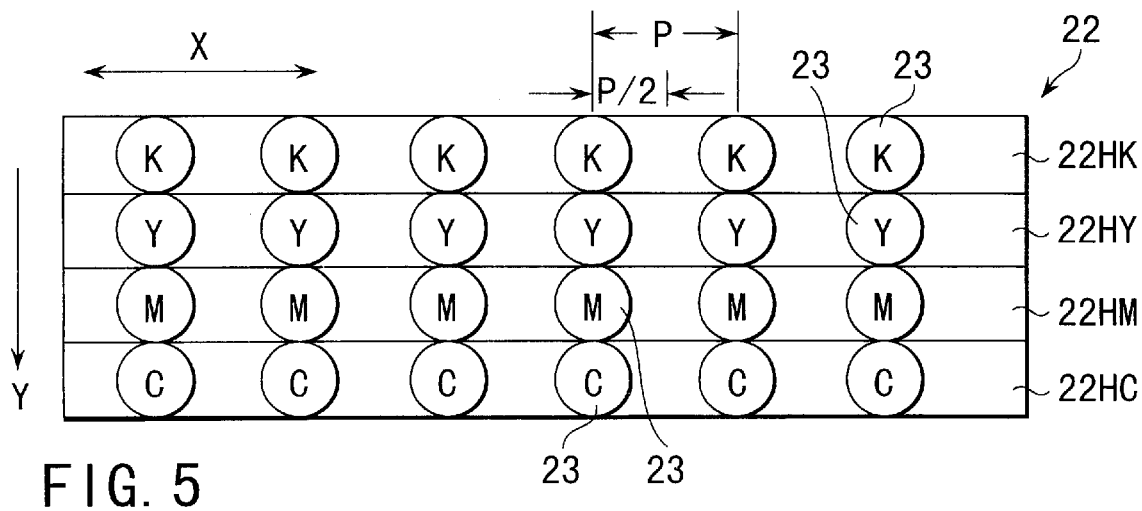
FIG. 5 is a view showing the structures of nozzle units built in the print head shown in FIG. 3.

The print head 22 includes four nozzle units 22HC, 22HM, 22HY, and 22HK which are arranged in series from upstream to downstream along the peripheral surface of the rotary drum 20 to respectively print the paper sheet with cyan (C), magenta (M), yellow (Y), and black (K) inks. Each of the nozzle units 22HC, 22HM, 22HY, and 22HK has a plurality of ink-jet nozzles 23 and ink chambers (not shown) commonly connected to the ink-jet nozzles 23. The ink-jet nozzles 23 are arranged in the axial direction (i.e., the main scanning direction X shown in FIG. 5) of the rotary drum 20 to have a span corresponding to the width of the A4 paper sheet, and eject ink of a corresponding color to the paper sheet. The nozzle units 22HC, 22HM, 22HY, and 22HK have an identical configuration that the distal ends of the ink-jet nozzles 23 are aligned at a height coinciding with the distal end face of the print head 22. Each ink-jet nozzle 23 is of the multi-drop scheme in which the tone of a dot varies with the number of ink drops, and forms, e.g., a dot ranging from the first tone (minimum tone) to the seventh tone (maximum tone). When the 0th tone is designated, no ink drop is ejected to form a dot.

The ink supply section 29 has four ink tanks 29B respectively storing cyan (C) ink, magenta (M) ink, yellow (Y) ink, and black (K) ink. The ink tanks 29B are respectively connected to the ink chambers of the nozzle units 22HC, 22HM, 22HY, and 22HK through four ink supply tubes 27.

The inks of the respective colors are supplied to the nozzle units 22HC, 22HM, 22HY, and 22HK by an ink supply pump 28 which rotates while pressing the ink supply tubes 27.

The rotary drum 20 holds the paper sheet wound around its peripheral surface, and rotates to move the paper sheet in a direction Y perpendicular to the main scanning direction X, while opposing the nozzle units 22HC, 22HM, 22HY, and 22HK. The rotary drum 20 is maintained at a constant rotation speed of, e.g., 120 rpm, to make one rotation every 0.5 second. In this ink-jet printer, a nozzle pitch P is set such that an image resolution of 600 dots/inch can be obtained by two printing operations. In printing operation, every time the rotary drum 20 makes one rotation, the print head 22 shifts in the main scanning direction X at a constant rate of ½ the nozzle pitch P. The print head 22 thus moves for a distance equal to the nozzle pitch P by two rotations of the rotary drum 20. If the rotary drum 20 makes one rotation for each of a sheet loading operation and a sheet unloading operation, the paper sheet is printed at a high speed of 20 PPM.

When the nozzle pitch P is increased to reduce the number of ink-jet nozzles 23, every time the rotary drum 20 rotates through one rotation, the print head 22 may be shifted by 1/n the nozzle pitch P. Accordingly, the print head 22 moves for a distance equal to the nozzle pitch P upon n rotations of the rotary drum 20. Then, an image resolution of 600 dpi can be obtained, in the same manner as that described above. Note that n is a positive integer. If a dot pitch corresponding to the image resolution is set as a reference, the nozzle pitch coincides with n times the dot pitch.

Figure 4:
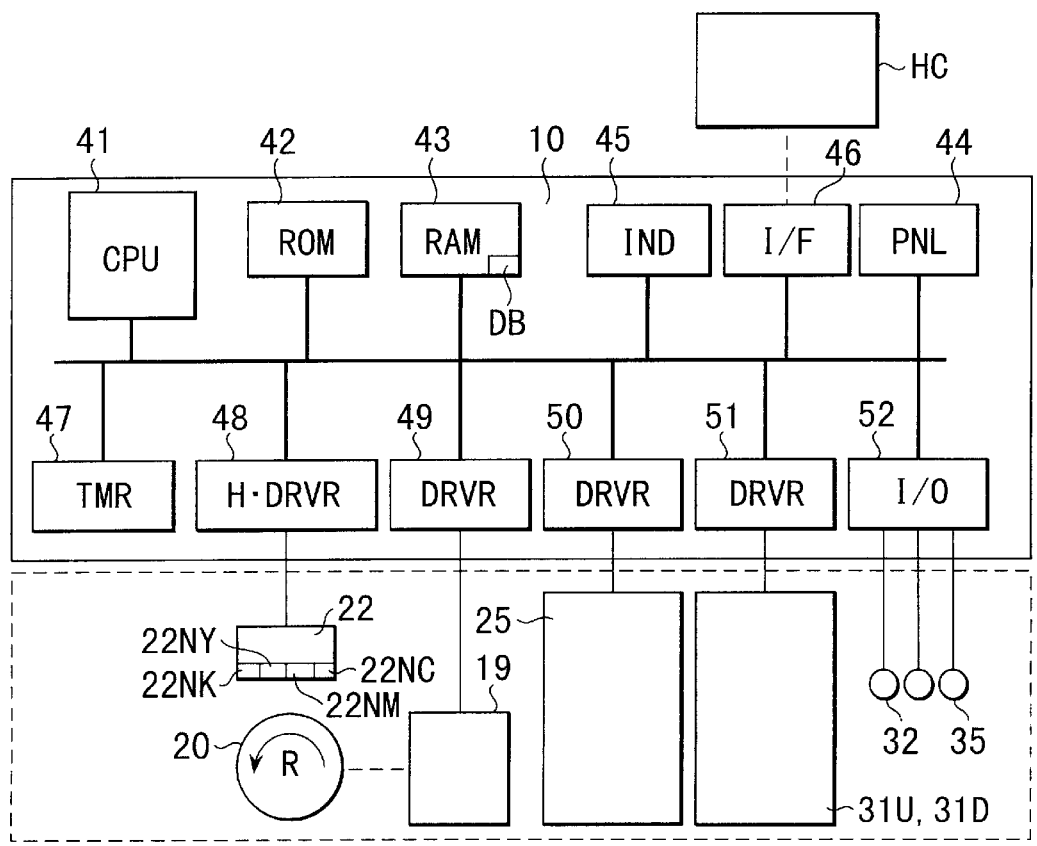
FIG. 4 is a block diagram showing the arrangement of the print control section shown in FIG. 3.

As shown in FIG. 4, the print control section 10 includes a CPU 41, a ROM 42, a RAM 43, an operation panel (PNL) 44, an indicator (IND) 45, an interface (I/F) 46, sensors 32 and 35, a timer (TMR) 47, drivers 48, 49, 50, and 51, and an input and output port (I/O) 52. The CPU 41 performs a variety of data processings. The ROM 42 stores fixed data such as the control program of the CPU 41 and font data. The RAM 43 temporarily stores print data and the like input to and output from the CPU 41. The operation panel 44 is manually operated to enter a variety of instructions. The indicator 45 indicates a variety of messages. The interface 46 receives print data and control commands supplied from an external computer HC through a data communication line such as LAN. The sensor 32 detects any convey error of the sheet feed-in mechanism 31U, and the sensor 35 detects any convey error of the sheet feed-out mechanism 31D. The timer 47 detects various types of time lapses. The driver (He DRVR) 48 drives the print head 22. The driver (DRVR) 49 drives the rotating mechanism 19. The driver (DRVR) 50 drives the elevator 25. The driver (DRVR) 51 drives the sheet feed-in mechanism 31U and sheet feed-out mechanism 31D. The input and output port 52 is connected to the sensors 32 and 35 and other components. For example, the CPU 41 performs an image processing of converting print data sent from the external computer HC into four sets of dot data each of which indicates a corresponding color image in a bit map form, and controls the driver 48 to drive the print head 22 in accordance with the sets of dot data. The RAM 43 includes a data buffer DB which stores the print data supplied from the external computer HC and four sets of dot data obtained from the CPU 41 and respectively assigned to the cyan (C), magenta (M), yellow (Y), and black (K) images.

Figure 6:
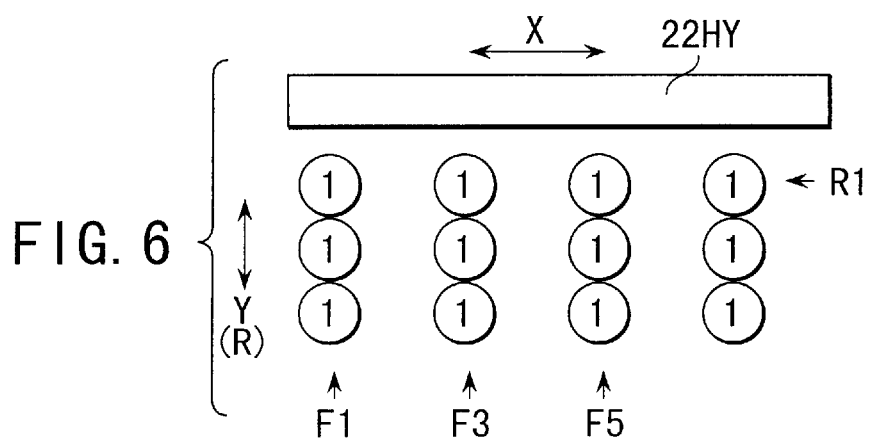
FIG. 6 is a view showing the first group of dots printed during the first rotation of the rotary drum shown in FIG. 1.

The print head 22 is controlled by the print control section 10 to print a plurality of dots forming the images in the respective colors. A control of the nozzle unit 22HY for printing an image formed of only yellow dots DY will be described below. During the first rotation of the rotary drum 20, as shown in FIG. 6, all the ink-jet nozzles 23 of the nozzle unit 22HY print dots of odd-numbered columns F1, F3, F5, . . . on a paper sheet moving in the subscanning direction Y perpendicular to the main scanning direction X. These dots are printed in units of rows. Reference numeral R1 denotes dots of the first row. Next, the print head 22 is shifted in the main scanning direction X by ½ the nozzle pitch P.

Figure 7:
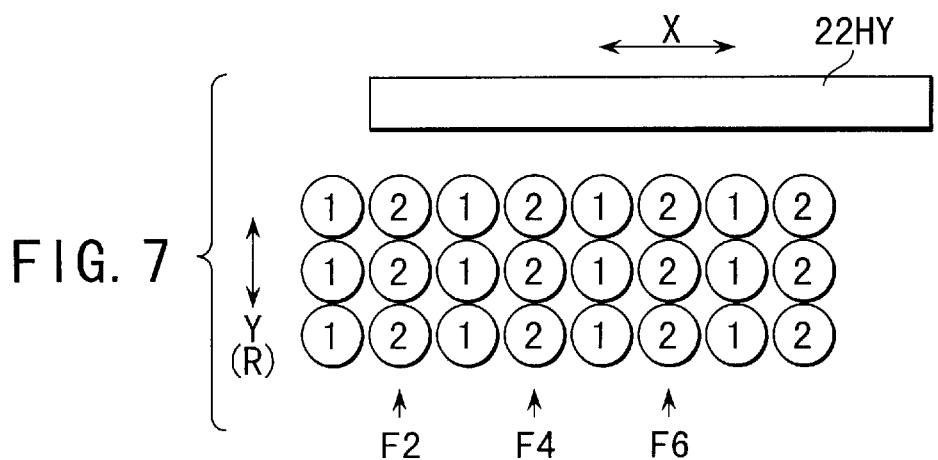
FIG. 7 is a view showing the second group of dots printed during the second rotation of the rotary drum shown in FIG. 1, together with the first group of dots.

During the second rotation of the rotary drum 20, as shown in FIG. 7, all the ink-jet nozzles 23 of the nozzle unit 22HY print dots of even-numbered columns F2, F4, F6, . . . on the paper sheet moving in the subscanning direction Y. These dots are printed in units of rows, in the same manner as during the first rotation of the rotary drum 20. In FIGS. 6 and 7, numerals "1" and "2" in the dot circles represent dots printed during the first and second rotations, respectively.

Figure 1:
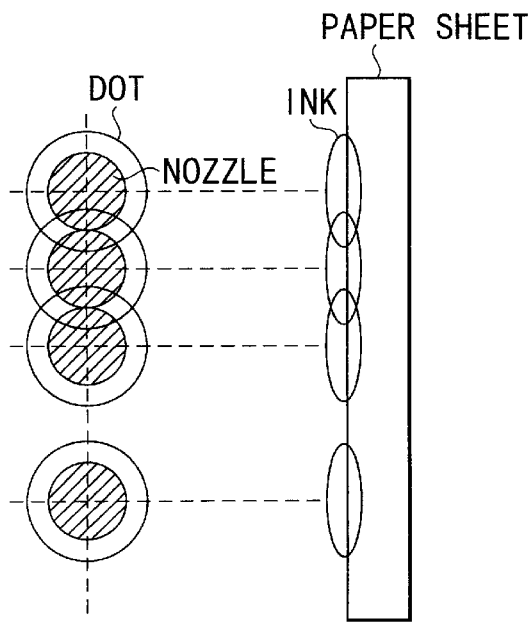
FIG. 1 is a view for comparing the diameters of the ink-jet nozzles of a generally used ink-jet printer and the diameters of dots printed on a paper sheet with ink ejected from these nozzles.
Figure 2:
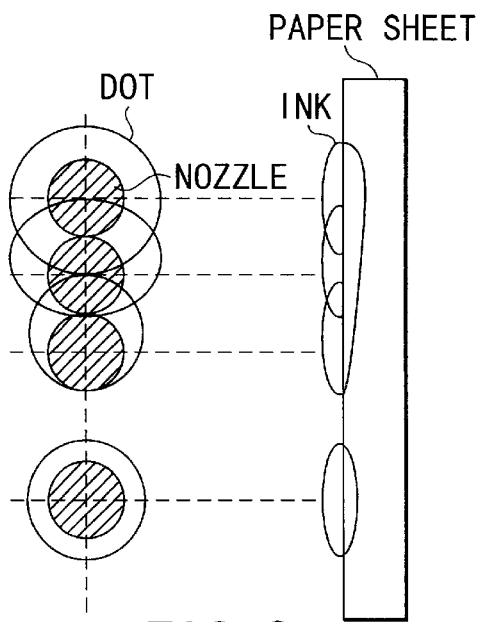
FIG. 2 is a view for comparing the regions of dots printed with the ink ejected from the same ink-jet nozzles as those shown in FIG. 1 to have different tones.

The CPU 41 of the print control section 10 executes the control program stored in the ROM 42 to perform the following tone control. FIG. 8 shows a plurality of dots printed while the rotary drum shown in FIG. 1 rotates twice, and tones designated by dot data items assigned to these dots. Assume that the data buffer DB stores dot data items for, e.g., the yellow image. In FIG. 8, the numerals in the dot circles represent the tones designated to these dots. A dot D13 of the first row, the third column, and a dot D14 of the first row, the fourth column have the seventh tone. A dot D33 of the third row, the third column has the second tone. A dot D34 of the third row, the fourth column has the seventh tone. The CPU 41 discriminates these tones designated by the dot data set of each color, and generates a dot data set in which the designated tones of the respective dots are corrected or regulated by referring to the designated tones of dots adjacent to these dots in the subscanning direction Y. More specifically, when the designated tone of a target dot is a reference tone or more and the designated tones of dots adjacent to it in the above manner are also the reference tone or more, the designated tone of the target dot is corrected to a regulation tone lower than the designated tone. In this embodiment, the reference tone is set to the seventh tone, which is the maximum tone, and the regulation tone is preset to the sixth tone, which is lower than the seventh tone.

The nozzle unit 22HY of the print head 22 is driven on the basis of the dot data set obtained by above correction.

During the first rotation of the rotary drum 20, the dots of the odd-numbered columns are actually printed to have the tones shown in FIG. 9. In the corrected dot data set, for example, the dot D13, a dot D23, the dot D33, and dots D43 and D53 of the third column are selectively corrected from tones 7, 7, 2, 3, and 7 respectively designated in the original dot data to tones 6, 6, 2, 3, and 7. More specifically, since both the dots D13 and D23 have the seventh tone or more, they are corrected to the sixth tone. Although the dot D53 has the seventh tone, it is not corrected and is maintained at the seventh tone since the dot D43 and a dot D63 (not shown) adjacent to it have the sixth tone or less.

During the second rotation of the rotary drum 20, the dots of the even-numbered columns are actually printed to have the tones shown in FIG. 10. In the corrected dot data set, for example, the dot D14, a dot D24, the dot D34, and dots D44 and D54 of the fourth column are selectively corrected from tones 7, 7, 7, 2, and 7 respectively designated in the original dot data to tones 6, 6, 6, 2, and 7. More specifically, since the dots D14, D24, and D34 have the seventh tone or more, they are corrected to the sixth tone. Although the dot D54 has the seventh tone, it is not corrected and is maintained at the seventh tone since the dot D44 and a dot D64 (not shown) adjacent to it have the sixth tone or less.

In this embodiment, concerning a dot data set assigned to dots in the same color where ink smear tends to occur, tone designation of each dot is done by referring to the designated tones of dots adjacent to it in the subscanning direction Y (column direction). When the designated tone of a target dot is the reference tone or more and the designated tones of the adjacent dots are also the reference tone or more, the designated tone of the target dot is corrected to a regulation tone lower than the designated tone. Hence, these dots can effectively have original tones designated within the range of the first tone to the seventh tone without causing ink smear in semi-dried dots aligned in the subscanning direction Y. As a result, quality degradation of a multi-tone image resulting from ink smear can be prevented. In particular, the image quality can be greatly improved in an ink-jet printer which prints on a paper sheet held by a rotary drum 20 rotating at a high speed in the subscanning direction Y.

Figure 11:
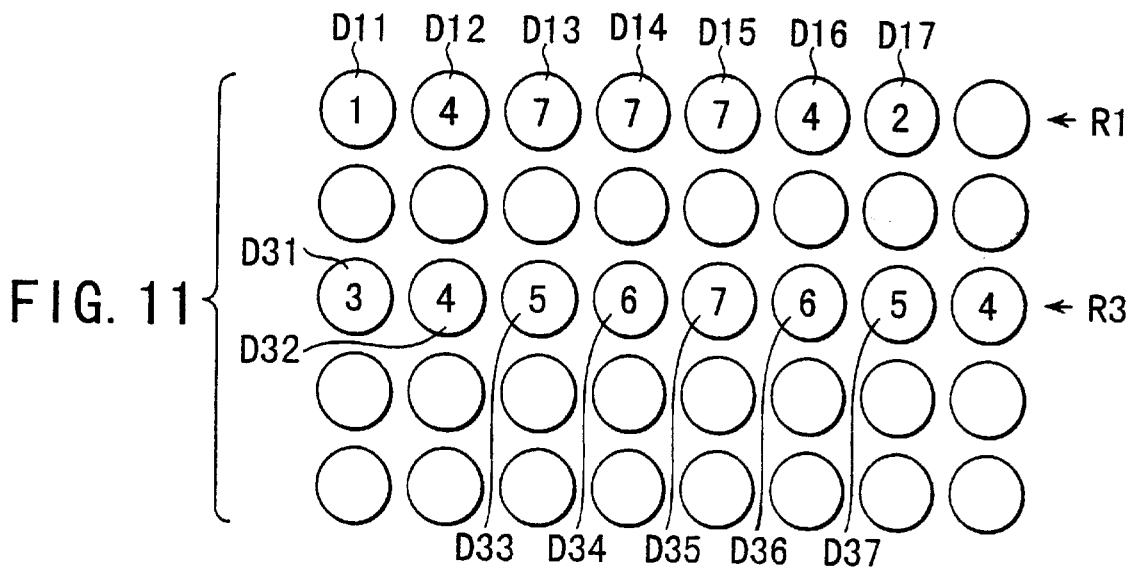
FIG. 11 is a view showing a plurality of dots printed while the rotary drum rotates twice in an ink-jet printer according to the second embodiment of the present invention, and tones designated by dot data items assigned to these dots.

An ink-jet printer according to the second embodiment of the present invention will be described. This ink-jet printer has the same arrangement as that of the first embodiment except for a control program stored in the ROM 42. This control program is formed such that the CPU 41 of the print control section 10 performs the following tone control operation. FIG. 11 shows a plurality of dots printed while the rotary drum 20 rotates twice, and tones designated by dot data items assigned to these dots. Assume that the data buffer DB stores dot data items for, e.g., a yellow image. In FIG. 11, the numerals in the dot circles represent the tones designated to these dots. For example, dots D11, D12, D13, D14, D15, D16, and D17 of the first row have tones 1, 4, 7, 7, 7, 4, 2, respectively, and dots D31, D32, D33, D34, D35, D36, and D37 of the third row have tones 3, 4, 5, 6, 7, 6, and 5, respectively. The CPU 41 discriminates these tones designated in the dot data set of each color, and generates a dot data set in which the designated tones of the respective dots are corrected with reference to the designated tones of dots adjacent to these dots in a main scanning direction X (row direction). More specifically, when the designated tone of a target dot is a reference tone or more and the designated tones of dots adjacent to it in the above manner are also the reference tone or more, the designated tone of the target dot is corrected to a regulation tone lower than the designated tone. In this embodiment, the reference tone is set to the seventh tone, which is the maximum tone, and the regulation tone is preset to the sixth tone, which is lower than the seventh tone.

The nozzle unit 22HY of the print head 22 is driven on the basis of the dot data set obtained by the above correction.

Figure 12:
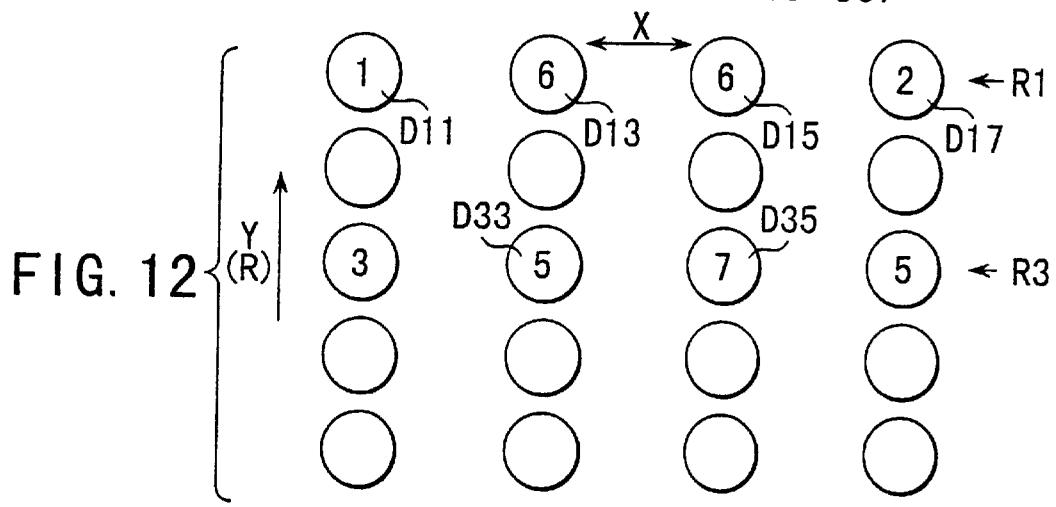
FIG. 12 is a view showing the result of tone correction performed in the main scanning direction for the first group of dots printed according to the tone designation shown in FIG. 11 during the first rotation of the rotary drum.
Figure 13:
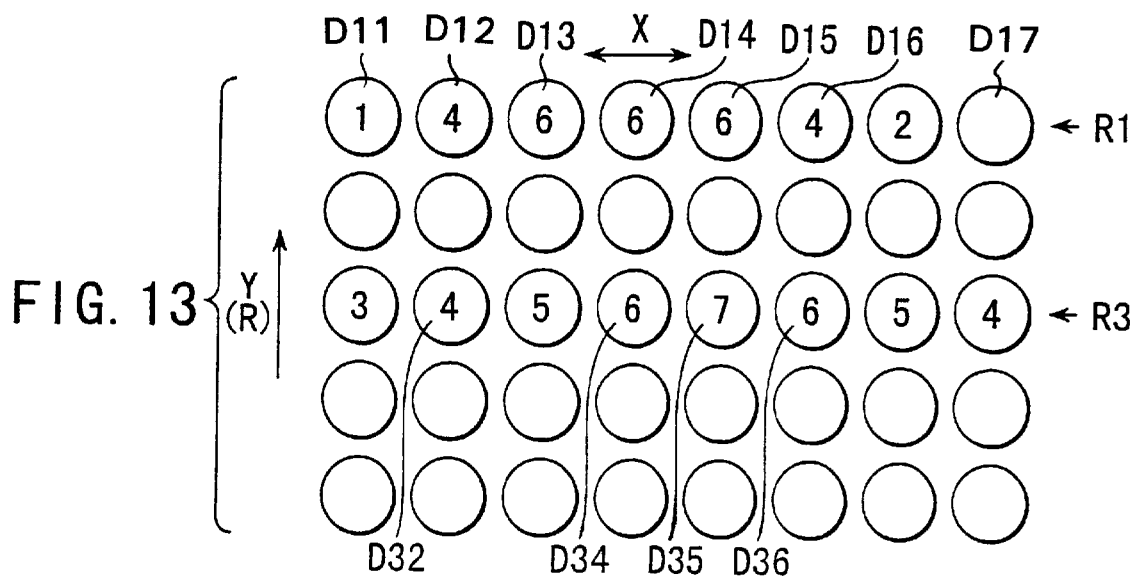
FIG. 13 is a view showing the result of tone correction performed in the main scanning direction for the second group of dots printed according to the tone designation shown in FIG. 11 during the second rotation of the rotary drum.

During the first rotation of the rotary drum 20, the dots of the odd-numbered columns are actually printed to have the tones shown in FIG. 12. During the second rotation of the rotary drum 20, the dots of the even-numbered columns are actually printed to have the tones shown in FIG. 13. In the corrected dot data set, for example, the dots D11, D12, D13, D14, D15, D16, and D17 of the first row are selectively corrected from tones 1, 4, 7, 7, 7, 4, and 2 respectively designated in the original dot data to tones 1, 4, 6, 6, 6, 4, and 2. The dots D31, D32, D33, D34, D35, D36, and D37 of the third row are selectively corrected to tones 3, 4, 5, 6, 7, 6, and 5. More specifically, since the dots D13, D14, and D15 have the seventh tone or more, they are corrected to the sixth tone. Although the dot D35 of the third row has the seventh tone, it is not corrected and is maintained at the seventh tone since the dots D34 and D36 adjacent to it have the sixth tone or less. Accordingly, the dots D31, D32, D33, D34, D35, D36, and D37 of the third row have tones equal to those in the original dot data.

In this embodiment, concerning a dot data set assigned to dots in the same color where ink smear tends to occur, tone designation of each dot is done by referring to the designated tones of dots adjacent to it in the main scanning direction X. When the designated tone of a target dot is the reference tone or more and the designated tones of the adjacent dots are also the reference tone or more, the designated tone of the target dot is corrected to a regulation tone lower than the designated tone. Hence, these dots can effectively have original tones designated within the range of the first tone to the seventh tone without any ink smear in semi-dried dots aligned in the main scanning direction X. As a result, quality degradation of a multi-tone image due to ink smear can be prevented. The scheme of this embodiment is particularly effective when printing lines in which a plurality of dots in the same color with different tones are aligned in the main scanning direction X.

Figure 14:
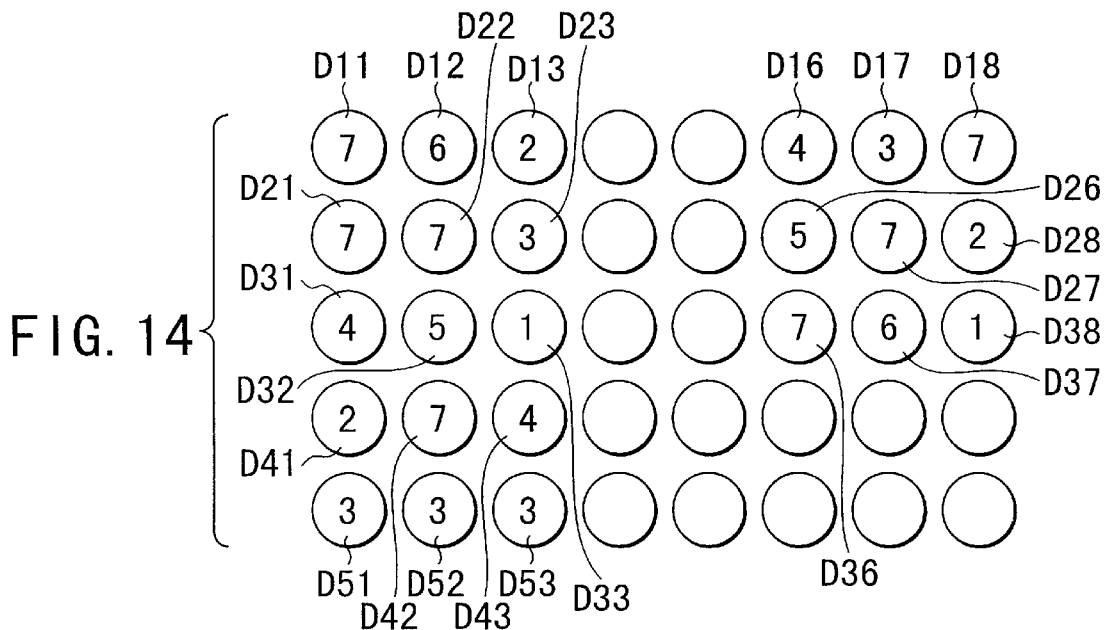
FIG. 14 is a view showing a plurality of dots printed while the rotary drum rotates twice in an ink-jet printer according to the third embodiment of the present invention, and tones designated by dot data items assigned to these dots.

An ink-jet printer according to the third embodiment of the present invention will be described. This ink-jet printer has the same arrangement as that of the first embodiment except for a control program stored in the ROM 42. This control program is formed such that the CPU 41 of the print control section 10 performs the following tone control operation. FIG. 14 shows a plurality of dots printed while the rotary drum 20 rotates twice, and tones designated by a plurality of dot data assigned to these dots. Assume that the data buffer DB stores dot data items for, e.g., a yellow image. In FIG. 14, the numerals in the dot circles represent tones designated to these dots. For example, dots D11, D12, D13, D16, D17, and D18 of the first row have tones 7, 6, 2, 4, 3, and 7, respectively. Dots D21, D22, D23, D26, D27, and D28 of the second row have tones 7, 7, 3, 5, 7, and 2, respectively. Dots D31, D32, D33, D36, D37, and D38 of the third row have tones 4, 5, 1, 7, 6, and 1, respectively. The CPU 41 discriminates these tones designated in the dot data set of each color, and generates a dot data set in which the designated tones of the respective dots are corrected with reference to the designated tones of dots adjacent to these dots in a main scanning direction X (line direction), a subscanning direction (column direction), and oblique directions. More specifically, when the designated tone of a target dot is a reference tone or more and the designated tones of dots adjacent to it in the above manner are also the reference tone or more, the designated tone of the target dot is corrected to a regulation tone lower than the designated tone. In this embodiment, the reference tone is set to the seventh tone, which is the maximum tone, and the regulation tone is preset to the sixth tone, which is lower than the seventh tone.

The nozzle unit 22HY of the print head 22 is driven on the basis of the dot data set obtained by above correction.

Figure 15:
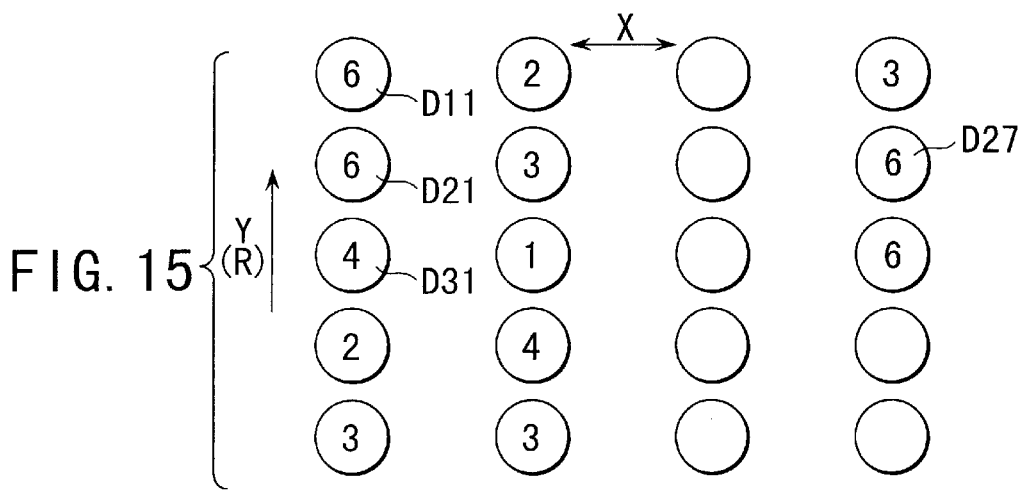
FIG. 15 is a view showing the result of tone correction performed in the main scanning direction, the subscanning direction, and the oblique directions for the first group of dots printed according to the tone designation shown in FIG. 14 during the first rotation of the rotary drum.
Figure 16:
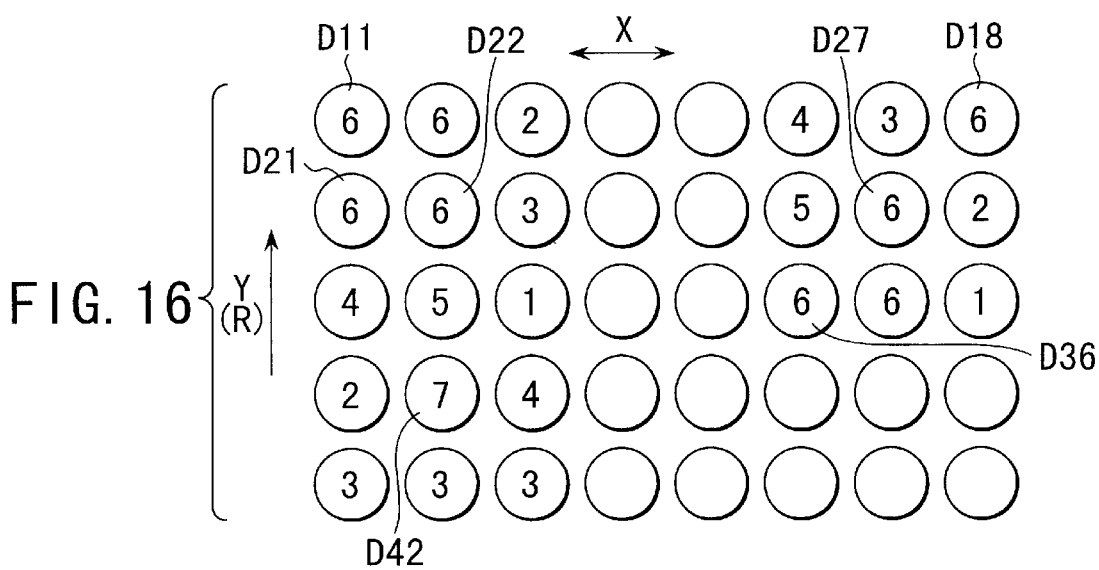
FIG. 16 is a view showing the result of tone correction performed in the main scanning direction, the subscanning direction, and the oblique directions for the second group of dots printed according to the tone designation shown in FIG. 14 during the second rotation of the rotary drum.

During the first rotation of the rotary drum 20, the dots of the odd-numbered columns are actually printed to have the tones shown in FIG. 15. During the second rotation of the rotary drum 20, the dots of the even-numbered columns are actually printed to have the tones shown in FIG. 16. In the corrected dot data set, for example, the dots D11, D12, D13, D16, D17, and D18 of the first row are selectively corrected from tones 7, 6, 2, 4, 3, and 7 respectively designated in the original dot data to tones 6, 6, 2, 4, 3, and 6. The dots D21, D22, D23, D26, D27, and D28 of the second row are selectively corrected from tones 7, 7, 3, 5, 7, and 2 respectively designated in the original dot data to tones 6, 6, 3, 5, 6, and 2. The dots D31, D32, D33, D36, D37, and D38 of the third row are selectively corrected from tones 4, 5, 1, 7, 6, and 1 respectively designated in the original dot data to tones 4, 5, 1, 7, 6, 1. More specifically, since the dots D11, D21, and D22 are adjacent to each other in the subscanning direction Y or oblique direction and have the seventh tone or more, they are corrected to the sixth tone. Since the dots D27 and D36 are adjacent to each other in the oblique direction and have the seventh tone or more, they are corrected to the sixth tone. Although a dot D42 has the seventh tone in FIG. 14, it is not corrected and is maintained at the seventh tone since the dots D31, D32, D33, D41, D43, D51, D52, and D53 adjacent to it in the main scanning direction X (line direction), the subscanning direction (column direction), or the oblique directions have the sixth tone or less.

In this embodiment, concerning a dot data set assigned to dots in the same color where ink smear tends to occur, tone designation of each dot is done by referring to the designated tones of dots adjacent to it in the main scanning direction X, the subscanning direction, and the oblique directions. When the designated tone of a target dot is the reference tone or more and the designated tones of the adjacent dots are also the reference tone or more, the designated tone of the target dot is corrected to a regulation tone lower than the designated tone. Hence, these dots can effectively have original tones designated within the range of the first tone to the seventh tone without ink smear in semi-dried dots aligned in the main scanning direction X, the subscanning direction Y, and the oblique directions. As a result, quality degradation of a multi-tone image caused by ink smear can be prevented. The scheme of this embodiment is particularly effective when printing at a high speed by using ink which is comparatively slow to dry.

Figure 17:
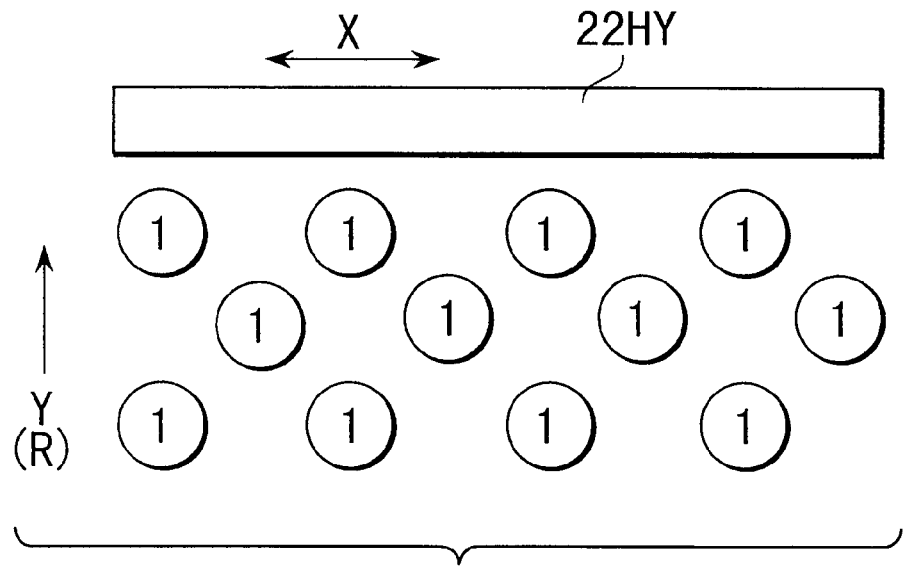
FIG. 17 is a view showing the first group of dots printed in a form different from that shown in FIG. 6.
Figure 18:
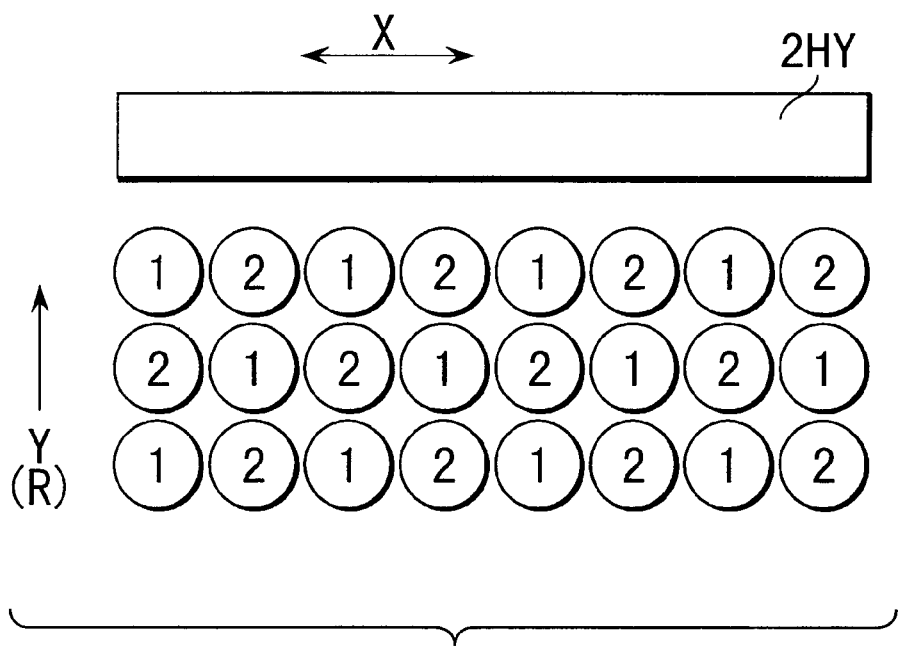
FIG. 18 is a view showing the second group of dots printed in a form different from that shown in FIG. 7, together with the first group of dots.

In the first to third embodiments described above, as shown in FIGS. 6 and 7, dots of odd-numbered columns and dots of even-numbered columns are printed during the first and second rotations, respectively, of the rotary drum 20. Alternatively, dots as shown in FIGS. 17 and 18 may be respectively printed during the first and second rotations of the rotary drum 20. When the rotation count of the rotary drum 20 required for printing is larger than two, the dot print format can be changed in accordance with the increased rotation count. The present invention can also be applied to a case where all the dots are printed while the paper sheet is moved only once relative to the ink-jet nozzles of one line by, e.g., the rotary drum 20 or other sheet moving mechanisms.

The reference tone and the regulation tone can be changed variously on the basis of the ink characteristics such as the viscosity, permeability, and drying speed, the paper sheet characteristics such as the water absorption properties, dryness, and thickness, the rotation speed of the rotary drum 20, and other conditions. Also, by considering the influences of the above conditions, weighting may be provided in the following manner. When the maximum tone is, e.g., the sixteenth tone, if dots adjacent to each other in the main scanning direction X have, e.g., the fourteenth tone (the first reference tone) or more, the dots are corrected to the thirteenth or fourteenth tone (the first regulation tone) one tone lower than the designated tone. If dots adjacent to each other in the subscanning direction Y have, e.g., the twelfth tone (the second reference tone) or more, the dots are corrected to the tenth to thirteenth tone (the second regulation tone) two tones lower than the designated tone.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ink-jet printer comprising:

a print head for printing a plurality of dots as an image by ejecting ink onto a print medium while the print medium is moving in a predetermined direction; and a print control section which stores a plurality of dot data assigned to the plurality of dots to designate tones thereof and which drives said print head according to the plurality of dot data;

wherein said print control section includes a correction section for correcting a tone of a target dot on the basis of a tone designated by dot data assigned to a dot adjacent to the target dot in said predetermined direction, in a manner so as to compensate for an ink flow due to inertia of semi-dried ink against movement of the print medium.

2. A printer according to claim 1, wherein said print head includes a plurality of ink-jet nozzles facing a rotary drum which rotates together with the print medium held thereon and arranged in an axial direction of said rotary drum perpendicular to said predetermined direction.

3. A printer according to claim 2, wherein said correction section corrects the target dot to have a regulation tone lower than a designated tone thereof when the designated tone of the target dot and a designated tone of the dot adjacent to the target dot in said predetermined direction are not less than a reference tone.

4. A printer according to claim 3, wherein said reference tone is a maximum tone requiring that a maximal amount of ink is ejected.

5. A printer according to claim 4, wherein said regulation tone is lower than the maximum tone by one unit tone level.

6. A printer according to claim 2, wherein said correction section corrects the target dot to have a regulation tone lower than a designated tone thereof when the designated tone of the target dot and a designated tone of the dot adjacent to the target dot in any of said predetermined direction and oblique directions oblique to said predetermined direction are not less than a reference tone.

7. A printer according to claim 6, wherein said reference tone is a maximum tone requiring that a maximal amount of ink is ejected.

8. A printer according to claim 7, wherein said regulation tone is lower than the maximum tone by one unit tone level.

9. A printer according to claim 2, wherein said print head is moved in said axial direction of said rotary drum by a 1/n pitch of said ink-jet nozzles each time said rotary drum makes one rotation, and said print control section includes a driver for driving said print head such that all the plurality of dots printed by the print head are printed during n rotations of said rotary drum.

* * * * *